Nov. 19, 1929.  D. I. FOGGER  1,736,433
TRAILER HITCH
Filed May 2, 1927
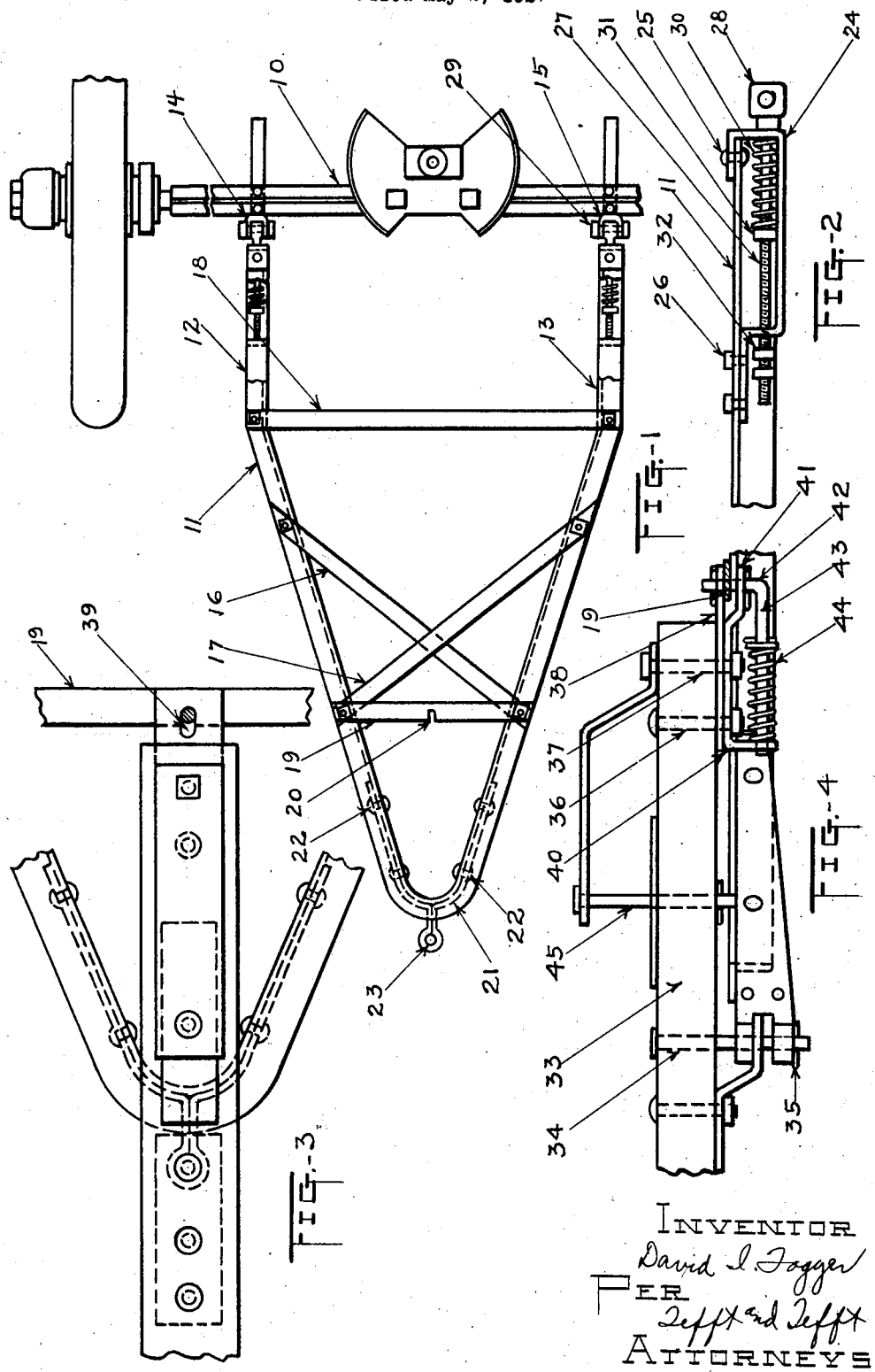
INVENTOR
David I. Fogger
PER
Tefft and Tefft
ATTORNEYS Patented Nov. 19, 1929

1,736,433

UNITED STATES PATENT OFFICE

DAVID I. FOGGER, OF PERU, ILLINOIS, ASSIGNOR TO PERU PLOW & WHEEL CO., OF PERU, ILLINOIS, A CORPORATION OF ILLINOIS

TRAILER HITCH

Application filed May 2, 1927. Serial No. 188,150.

This invention relates to hitches or draw bar structures for trailer members.

One of the objects of the invention is in the provision of a hitch or draw bar structure for a trailer mechanism, said hitch being fashioned in a manner to stabilize the connection between the power vehicle and the trailer member.

Another object is in the provision of a hitch for connecting a power vehicle and a trailer mechanism, said hitch including a tensioned connection with the trailer member to prevent swaying thereof when drawn rapidly.

Still another object is in the provision of a hitch or draw bar structure for trailer members fashioned to receive a tongue member when it is desirable to use the trailer as a horse drawn vehicle.

Other objects will appear in the following specification, taken in connection with the annexed drawings, in which Fig. 1 is a plan view of the hitch member, portions thereof being broken away for a more detailed disclosure;

Fig. 2 is a detail showing of the stabilizer or tensioned connecting means between the hitch and the trailer member;

Fig. 3 is a plan view showing the connection of the tongue to the hitch, and

Fig. 4 is a side elevation, showing in detail the manner of connecting the tongue to the hitch.

Before referring particularly to the drawings, it might be stated that the present hitch or draw bar structure is adapted to be used as a connecting means between a power vehicle such as an automobile, tractor or the like, and a trailer member. This hitch is distinguished from the ordinary connecting means of the same general nature in that it includes a stabilizing connecting means with the trailer member, which permits said trailer to be drawn rapidly behind the power vehicle without the objectionable swaying which would be otherwise present without the stabilizer.

Irrespective of the care taken in producing any of the ordinary types of hitches or connecting members, it is usually found that the actual connection is made in a rather loose manner, and whenever a trailer member is drawn rapidly behind a power vehicle, there is occasioned a slight swaying, which increases with the speed, the swaying increasing to such a point that finally not only is there a dangerous sidewise movement of the trailer, especially when loaded, but such swaying movement is transmitted to the power vehicle and causes in all an extremely dangerous condition.

In order to offset this disadvantage and to permit the trailer to be drawn rapidly, applicant has devised a stabilizing connection, or as a matter of fact, a spring tensioned connection, which insures, at all times, a positive drawing connection between the power vehicle and the trailer. This hitch member also is fashioned to receive a wagon tongue when it is desirable that the trailer mechanism be used as a horse-drawn vehicle. The hitch is designed to permit this adjustment, or rather, connection of the tongue thereto very quickly and with a minimum of adjustment.

Referring now to the drawings, in Fig. 1 only a portion of a trailer member has been shown, the same being generally designated 10. The hitch comprises a framing or drawbar structure 11 formed of angle irons, and as a matter of fact same is a continuous angle iron bent in the manner shown in the drawings to provide a sturdy framing portion, with the connecting ends 12 and 13 thereof spaced to permit connection with the forwardly projecting bifurcated brackets 14 and 15 respectively on the front axle assembly of the trailer member, partially shown at 10.

Means for bracing the draw bar structure 11 is provided in the cross braces 16 and 17, as well as the cross braces 18 and 19. The slot 20 will be noted in the cross brace 19, and is utilized when the connection is made with a wagon tongue. To the front and rounded end 21 of the hitch or draw bar member is securely riveted, as at 22, an apertured attachment member 23 adapted to engage a receiving lug, not shown, on the power structure that is adapted to draw the trailer.

The stabilizing means before mentioned is shown in detail in Fig. 2, the same comprising the connection between the spaced portions 12 and 13 of the hitch and the trailer member. This stabilizing means comprises the portions 24, which are connected, as at 25, and 26, to the angle iron 11 in a manner to form substantial yoke members. Rods 27, projecting through suitable apertures in the yoke members, have their rear ends carrying apertured receiving lugs 28, adapted to be engaged by bolts 29 to complete the connection between the trailer and hitch.

A tensioned connection between the rods 27 and the hitch is provided in the coil springs 30, which abut at one end the yoke member and at the other end adjustable nuts 31, screwed onto the threaded portion of the rods 27. An additional adjustment mechanism for the spring tensioned connection is provided in the nuts 32, which limit the movement of the stabilizer or spring tensioned connecting means as well as providing an added feature of safety.

The above description is thought complete, as far as the hitch itself is concerned, when used merely as a connecting means between a power vehicle and a trailer member. However, when it is desired to use the trailer as a horse-drawn vehicle, it is necessary to attach a tongue to the hitch, and in this instance, the hitch is not changed at all, but the tongue is attached to the hitch without the necessity of making the connection in a permanent manner. The rear end of a tongue 33 is provided with bolt member 34 which projects through the apertured receiving member 23, and is keyed thereto by the conventional cotter key 35. An offset bracket 35ª on tongue 33 is fashioned to receive the lower end of the bolt 34 through an aperture therein, the lower end of the bracket being received in a slot in the member 23. The tongue 33 also carries mechanism for engaging the cross bar 19, and a spring tensioned lug for engaging the slot 20 to complete the temporary but positive connection between the rear end of the tongue and the hitch.

Securely bolted, as at 36 and 37, to the rear end of the tongue 33, is a plate 38, having a slot 39 therein. Carried also by the bolts 36 and 37 is a bracket 40 having the rearwardly projecting portion 41, which forms a bifurcated portion when taken in connection with the rear end of the plate 38. This bracket 40 and also the portion 41, thereof, provides means for carrying the vertically disposed lug 42. The rod 43, of which said upstanding lug is merely a part, is spring tensioned by means of the coil spring 44, with respect to the bracket 40, and therefore provides a means for holding the lug 42 in engagement with the slot 20 in the hitch, when the tongue is connected thereto. As stated before, the bolt 34 engages the receiving end 23 of the hitch, and the rear end of the tongue is then swung into position with respect to the cross bar 19, and the lug 42 is forced into the notch 20 in a manner to hold the rear end of the tongue in a fixed position as respects that portion of the hitch.

With these two positive, although not permanent connections, between the tongue and the hitch, it is apparent that the rear end of the tongue is held in a very rigid and sturdy manner, and that the conventional singletree mechanism may be attached to the upstanding bolt member 45, and thereafter the horses hitched to the tongue structure in the conventional manner. The trailer, under these conditions, has become a horse-drawn vehicle.

It is apparent, also, that whenever the trailer is drawn by a motor vehicle or the like, the tongue may be quickly removed by withdrawal of the bolt 34 and by loosening the lug 42 from the slot 20.

In view of the above description, it is thought that the operation of the hitch need not be stated further in detail.

What I claim is:

1. Tongue and hitch mechanism including a framing member, bracing means therefor, mechanism permitting a spring tensioned connection between the framing structure and trailing vehicle, a notched cross brace on the framing structure, a receiving member on the forward end of the hitch, a tongue, a bolt adapted to connect the tongue with the receiving portion of the hitch and a spring tensioned lug attached to the rear end of the tongue and adapted to engage the notched cross bar and to complete a positive connection between the tongue and hitch.

2. Tongue and hitch mechanism, including a framing member, bracing means therefor, mechanism permitting connection between the framing structure and the trailing vehicle, a notched cross member on the framing structure, a receiving member on the forward end of the hitch, a tongue, a bolt adapted to connect the tongue with the receiving portion of the hitch, and a spring tensioned lug attached to the rear end of the tongue and adapted to engage the notched cross bar and complete a positive connection between the tongue and hitch.

In testimony whereof, I have hereunto affixed my signature.

DAVID I. FOGGER.